R. E. WEST.
APPARATUS FOR PREPARING COFFEE INFUSIONS.
APPLICATION FILED MAY 3, 1916.
1,291,315.
Patented Jan. 14, 1919.
3 SHEETS—SHEET 1.
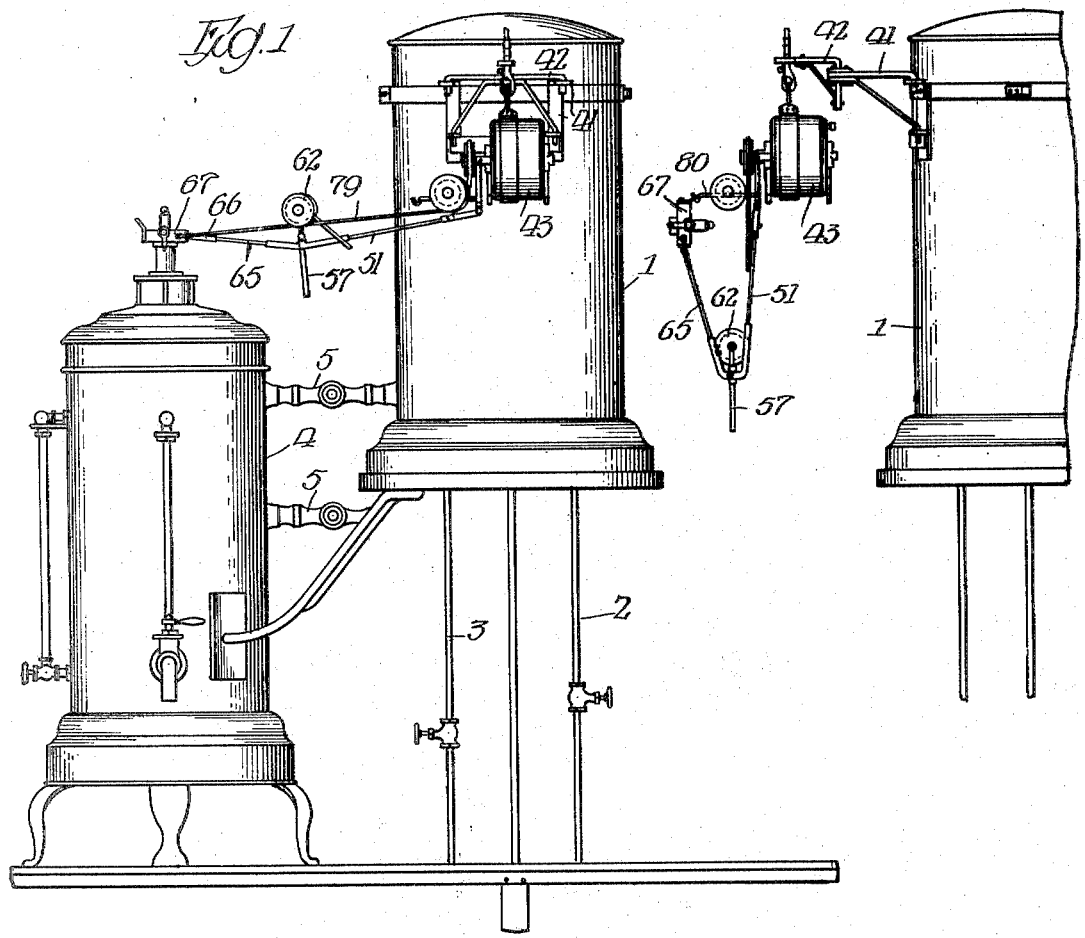
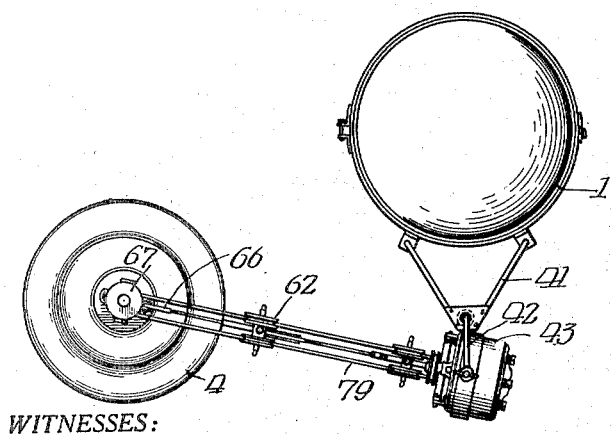

R. E. WEST.
APPARATUS FOR PREPARING COFFEE INFUSIONS.
APPLICATION FILED MAY 3, 1916.
1,291,315.
Patented Jan. 14, 1919.
3 SHEETS—SHEET 2.
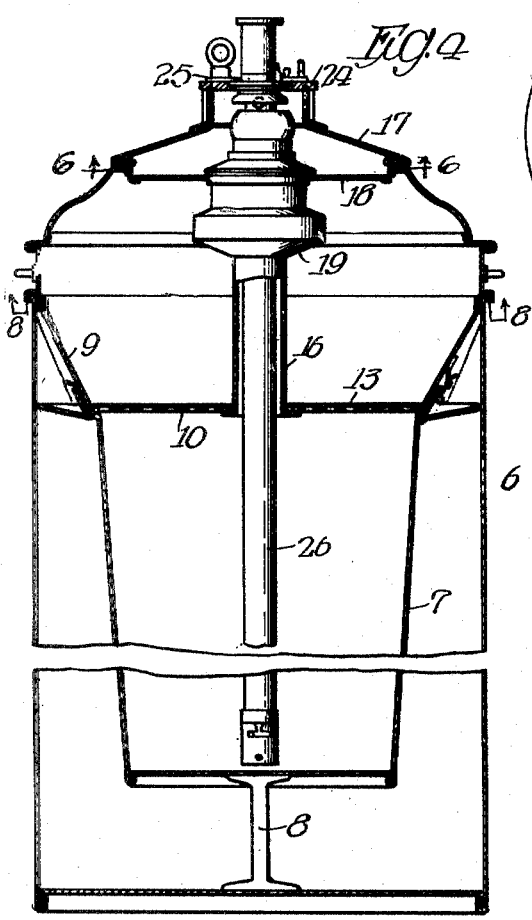
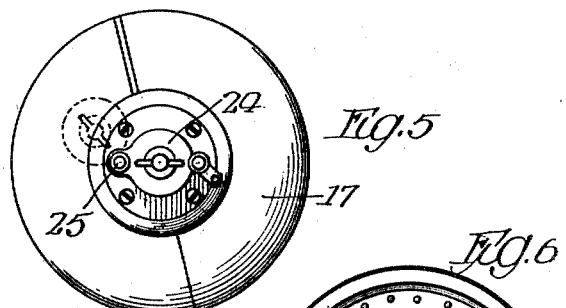
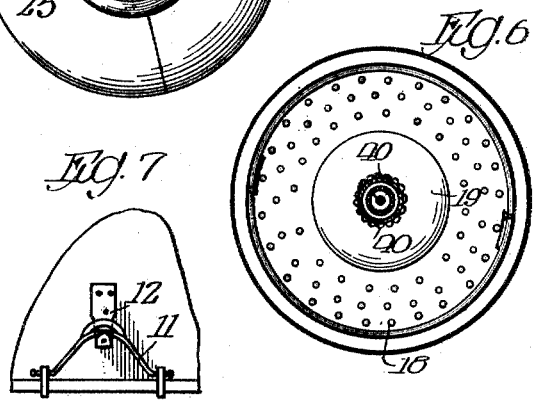
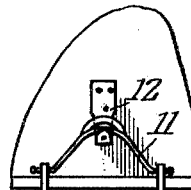
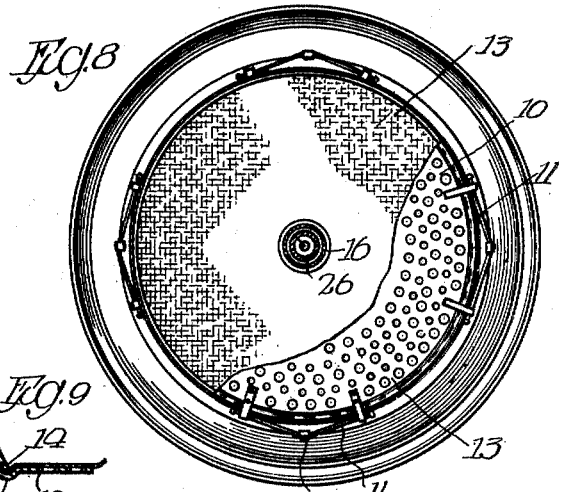
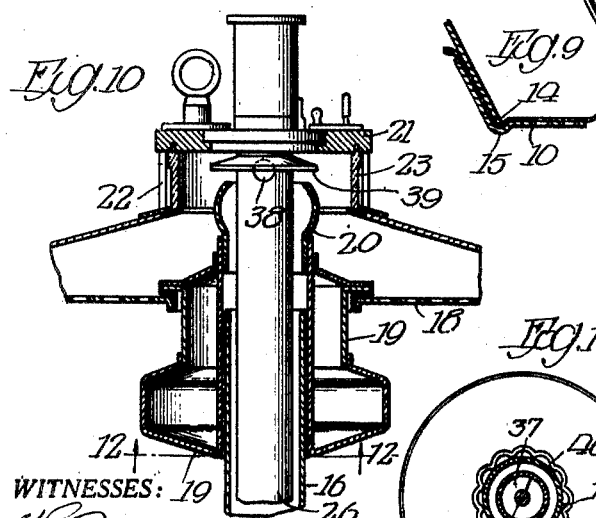
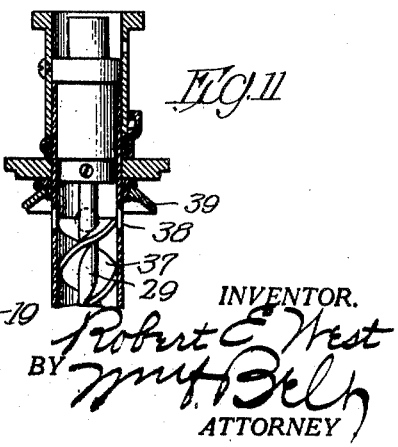
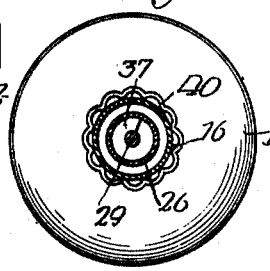
WITNESSES:
INVENTOR.
Robert E. West
BY
ATTORNEY

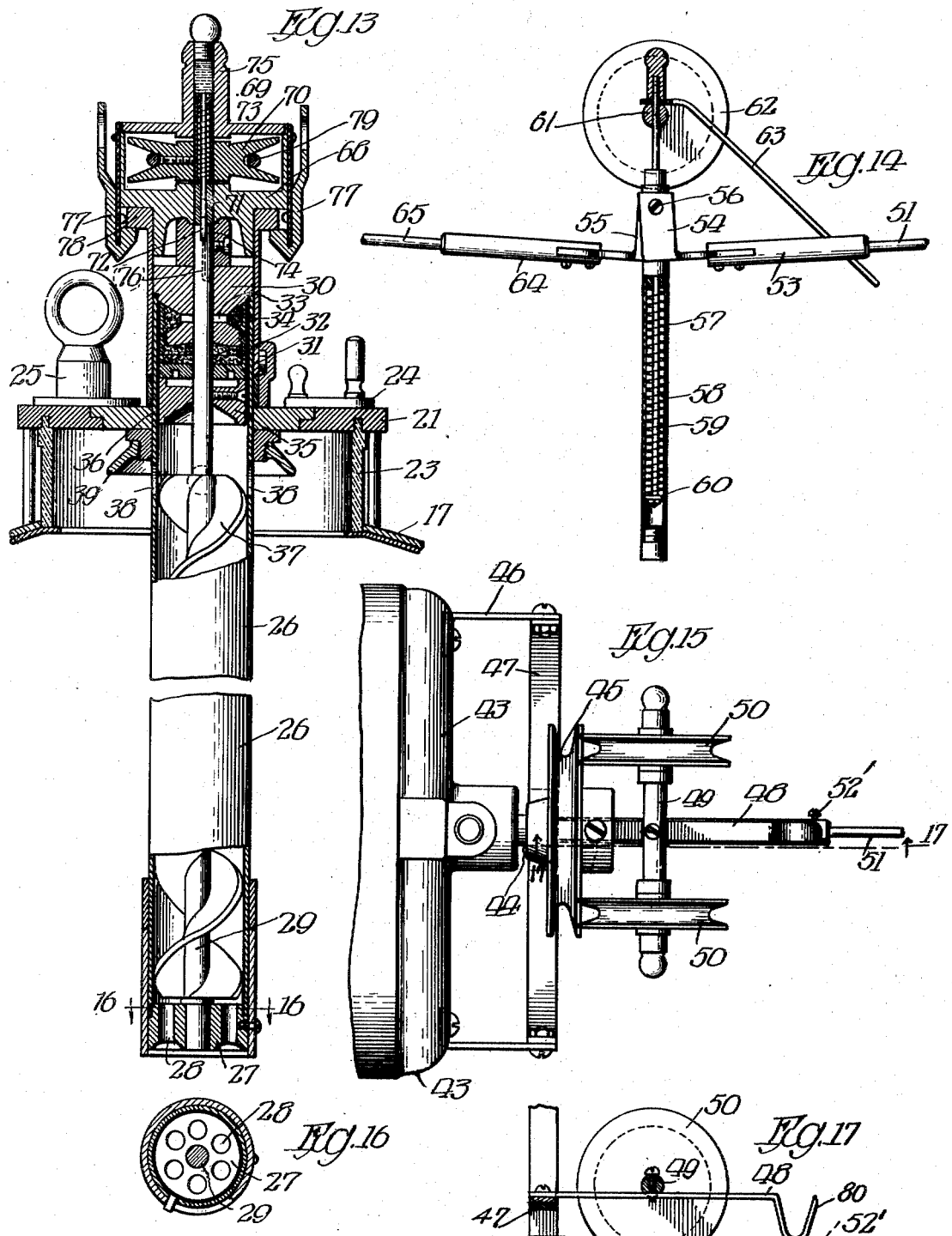

UNITED STATES PATENT OFFICE.

ROBERT E. WEST, OF COLORADO SPRINGS, COLORADO.

APPARATUS FOR PREPARING COFFEE INFUSIONS.

1,291,315.     Specification of Letters Patent.     Patented Jan. 14, 1919.

Application filed May 3, 1916. Serial No. 95,013.

*To all whom it may concern:*

Be it known that I, ROBERT E. WEST, a citizen of the United States, residing at Colorado Springs, in the county of El Paso and State of Colorado, have invented certain new and useful Improvements in Apparatus for Preparing Coffee Infusions, of which the following is a specification.

This invention relates in general to apparatus for preparing infusions of coffee and more particularly to a coffee urn adapted for use in restaurants and the like.

Two types of coffee urns are in general use. In one of these types a bag of textile material is filled with coffee and is supported so that the coffee is partially submerged in the liquid within the urn. In preparing the infusion the attendant is required to draw the hot liquid from the urn and pour it over the coffee suspended in the top. The top of the urn is necessarily removed during this operation allowing the escape of steam and the volatile aromatic principles of the coffee and obviously the greater portion of the liquid passes through the bag above the coffee and does not percolate therethrough.

In the other type the liquid is necessarily raised to its boiling point to force it by pressure of the accumulated steam through an upwardly extending tube which delivers the liquid to the coffee. The boiling of the coffee destroys its color and natural flavor and results in the extraction of principles of the coffee which reduces the value of the infusion as a beverage.

It is an object of my invention to provide an apparatus for preparing infusions of coffee which overcome the above enumerated difficulties and which has, moreover, many advantages over any apparatus heretofore known or used for this purpose.

A further object of my invention is the provision of an apparatus for preparing infusions of coffee which is simple in construction, automatic and economical in operation and which is easily kept in a clean and sanitary condition.

Further objects and advantages of my invention will be apparent as it is better understood by reference to the following specification when read in connection with the accompanying drawing, illustrating the preferred embodiment thereof, in which—

Figure 1 is a side elevation of an apparatus according to my invention for preparing infusions of coffee;

Fig. 2 is an elevation illustrating the means for supporting the driving motor and power-transmitting mechanism;

Fig. 3 is a plan view of the structure illustrated in Fig. 1;

Fig. 4 is a transverse vertical section through the coffee urn;

Fig. 5 is a plan view of the structure illustrated in Fig. 4;

Fig. 6 is a section on the line 6—6 of Fig. 4;

Fig. 7 is a detail in elevation of the means for fastening the support for the coffee in position;

Fig. 8 is a horizontal section on the line 8—8 of Fig. 4;

Fig. 9 is a detail in section of a portion of the support for the coffee;

Fig. 10 is a vertical section through the upper portion of the mechanism illustrating the float;

Fig. 11 is a vertical section through the upper portion of the elevator mechanism;

Fig. 12 is a section on the line 12—12 of Fig. 10;

Fig. 13 is a detail in section of the elevator mechanism;

Fig. 14 is a detail in elevation partially in section of the belt tightener on the power-transmitting mechanism;

Fig. 15 is a plan view of a portion of the power-transmitting mechanism;

Fig. 16 is a section on the line 16—16 of Fig. 13, and

Fig. 17 is a section on the line 17—17 of Fig. 15.

Referring to the drawing, 1 indicates a water heater of the usual and well-known type, connected by a pipe 2 to a source of water supply. The heater 1 may be supplied with fuel through the pipe 3. A coffee urn 4 is disposed adjacent the water heater 1 and connected thereto by pipes 5, whereby water from the heater is supplied at intervals to the urn. The urn 4 may be in form and dimensions similar to well-known types now in use and may be supplied with heat in any suitable manner.

The urn 4 comprises a suitable outer casing 6 (Fig. 4) within which a receptacle 7 for the infusion is supported upon a suitable pedestal 8. Supported upon the upper edge of the casing 6 is a container 9 having a removable foraminous bottom 10 normally secured in position by members 11 (Fig. 7) pivotally secured to the bottom 10 and engaging hooks 12 secured to the outer sides of the container 9. A strainer 13, preferably of textile fabric, is supported on the foraminous bottom 10 extending beneath the lower edge 14 (Fig. 9) of the receptacle 9, the foraminous bottom 10 being provided with a bead 15 to receive the edge 14. An upwardly extending tubular member 16 is secured to the foraminous bottom 10 centrally thereof. The receptacle 9 is open at its top and provided with a removable hollow cover 17 having a foraminous bottom 18 which supports a loosely mounted float 19 (Fig. 10), the float being provided with an upwardly extending tubular member 20 the purpose of which will be hereafter more fully explained. The cover 17 is provided with a top member 21 supported from the body of the cover by rods 22 and a cylindrical sight glass 23 is disposed between the body of the cover 17 and the top member 21. A member 24 (Fig. 5) is pivotally mounted at 25 on the top member 21 to normally close an opening therein. The member 24 may be swung to the position indicated by dotted lines in Fig. 5.

When the member 24 is in the position indicated in dotted lines in Fig. 5 a tube 26 (Fig. 13) may be inserted through the opening, the tube extending to a point closely adjacent the bottom of the receptacle 7. At the lower end of the tube 26 a bearing 27 is secured, the bearing being provided with a plurality of openings 28 (Fig. 16). One end of a shaft 29 is supported in the bearing 27, the shaft 29 extending upwardly through the tube 26 to a point adjacent the upper end thereof where it is journaled in a bearing 30 beneath which is a gland comprising a member 31 and packing 32 disposed between the member 31 and the end of the bearing 30. Openings 33 are provided through the bearing 30 and packing 34 is disposed in a groove about the bearing 30, the object of the packing 32 and 34 being to prevent oil from passing into the interior of the tube 26. As an additional precaution the member 35, fitting closely within the tube 26, is secured to the shaft 29 and is provided with a depression 36 to receive any oil which may pass the gland.

The shaft 29 is provided with a screw 37 which, when the shaft is rotated, lifts the liquid from the bottom of the receptacle 7 and discharges it through suitable openings 38 at the upper end of the tube 26. A shield 39, secured to the tube 26 above the openings 38, directs the liquid downwardly as it issues from the openings. The shield 39 has the further function of coöperating with the tubular member 20 on the float 19 to prevent the liquid from issuing from the openings 38 when the float 19 is lifted by the accumulation of an excessive amount of liquid within the receptacle 9. The inner face 40 of the float 19 is fluted, as indicated in Fig. 12, to prevent particles of coffee from accumulating between the inner face 40 and the tubular member 16, thus insuring the operation of the float 19 whenever an excess of liquid accumulates.

Supported upon the water heater 1 or upon any suitable support is a bracket 41, upon which a crane 42 is pivotally mounted. An electric motor 43 is supported from the crane 42 and is provided with a shaft 44 having a pulley 45 secured thereto. Suitable brackets 46, secured to the casing of the motor 43, support a member 47 to which an arm 48 is secured. A shaft 49 mounted on the arm 48 supports a pair of pulleys 50. A rod 51, adjustably mounted by means of a screw 52' on the member 52 connects the member 52 to a member 53 having a yoke 54 in which a member 55 is pivotally supported at 56. A tube 57 is connected to the member 55 and contains a spring 58 and a rod 59 having a washer 60 at its end bearing against the spring 58. The upper end of the rod 59 supports a shaft 61 upon which pulleys 62 are rotatably mounted. A fork 63 engaging the member 53 retains the pulleys 62 in alinement with the pulleys 50. A member 64 connects the member 55 to a rod 65 which in turn is connected to a member 66 pivotally supporting a coupler 67 comprising a casing 68 within which a hollow shaft 69 is journaled, a pulley 70 being secured to the shaft 69 within the casing 68. A pin 71 having a flattened end 72 is slidably mounted within the hollow shaft 69, a spring 73 being provided within the shaft 69 to normally force the pin 71 to the position indicated in Fig. 13. The flattened end 72 of the pin 71 is disposed in a slot in the end of the shaft 69 and consequently rotates therewith. The flattened end 72 is adapted to engage a slot 74 in the end of the shaft 29. An oil cap 75 is arranged at the upper end of the casing 68 and contains sufficient oil to insure lubrication of the bearings for a considerable period of time. A duct 76 leads from the bottom of the slot 74 to the bearing 30 whereby oil is supplied thereto. The purpose of providing the pin 71 is to permit the shaft 69 to be automatically coupled to the shaft 29 when the coupler 67 is placed in coupling position. If the slot 74 is not disposed in proper angular position to be engaged by the flattened end 72 of the pin 71 the pin will be forced upwardly against the spring 73 and will automatically engage the slot 74 after the shaft has been rotated. Latches 77 mounted on the sides of the casing 68 engage beneath a flange 78 and retain the coupler 67 in operative position. An endless belt 79 is disposed about the pulleys 45, 50, 62 and 70 to transmit power from the motor 43 to the shafts 69 and 29. The pulleys 62 cause the belt 79 to be maintained under the tension of the spring 58.

In utilizing my invention a fresh strainer 13 is disposed upon the foraminous bottom 10 which is locked to the container 9 and a charge of coffee ground in the usual manner is disposed upon the strainer 13. The cover 17 is placed in position and a supply of hot water is allowed to flow from the water heater 1 to the receptacle 7. If the heater 1 is not in use hot water may be obtained from any suitable source or may be heated directly in the receptacle 7. The tube 26 is inserted and the coupler 67 is removed from the hook 80 (Fig. 2) upon which it is normally supported and is placed in the position indicated in Fig. 13 to couple the shaft 69 to the shaft 29. The motor 43 is then started and the shaft 29 is thereby rotated to lift the liquid from the receptacle 7 and discharge it through the openings 38 whence it is directed downwardly by the shield 39 and the curved face of the tubular member 20, flowing over the foraminous bottom 18 of the cover 17 which distributes the liquid uniformly over the coffee within the container 9. The liquid can escape only by percolating through the coffee. This percolation insures thorough extraction of the coffee provided the temperature of the liquid is maintained at a point which is preferably slightly below the boiling point. When the coffee has been completely extracted the coupler 67 is removed and the tube 26 may also be removed or may remain in position. When the infusion has been exhausted the coffee may be removed from the container 9, a new strainer 13 substituted and a fresh charge of coffee placed in the container 9 whereupon the operation may be repeated. Should a quantity of liquid accumulate within the container 9 sufficient to raise the float 19 further flow of the liquid from the pump to the container 9 will be effectually prevented until the float is again allowed to descend by the percolation of some of the liquid through the charge of coffee.

It will be understood from the foregoing that I have perfected an apparatus which provides means for mechanically elevating the liquid and discharging it over a charge of coffee, the container for the coffee being so arranged that the liquid necessarily passes through the charge while the charge of coffee is always maintained out of contact with the body of the liquid within the infusion-receiving receptacle. It will be further apparent that my apparatus is closed at all times so that steam can not escape therefrom and in fact it is not necessary that any steam be formed, the liquid being preferably maintained at a temperature below the boiling point thereof. The apparatus is automatic in operation, requiring no attention beyond charging and the stopping and starting of the motor and is simple in construction and readily dismantled for cleaning.

It will be obvious, moreover, that various changes may be made in the form, construction and arrangement of the parts without departing from the spirit and scope of the invention, or sacrificing any of its material advantages, the form hereinbefore described being merely a preferred embodiment thereof.

I claim:

1. In an apparatus of the character described, the combination of a liquid receptacle, a removable container for a charge of coffee above said receptacle, a cover for said container and mechanically operated means supported by said cover within said receptacle and adapted to be readily withdrawn therefrom for lifting liquid from said receptacle and delivering it continuously to the charge of coffee.

2. In an apparatus of the character described, the combination of a liquid receptacle, a removable container for a charge of coffee above said receptacle, a cover for said container, a tube supported by said cover and extending through said container to substantially the bottom of said receptacle, a tube having discharge and inlet openings at its upper and lower ends respectively and mechanically operated means within said tube for lifting liquid from said receptacle and delivering it continuously through said outlet openings to the charge of coffee.

3. In an apparatus of the character described, the combination of a liquid receptacle, a removable container for a charge of coffee above said receptacle, a cover for said container, a tube supported in said cover and extending through said container to substantially the bottom of said receptacle, said tube having discharge and inlet openings at its upper and lower ends respectively, and a screw within said tube for lifting liquid from said receptacle and delivering it to the charge of coffee.

4. In an apparatus of the character described, the combination of a liquid receptacle, a removable container for a charge of coffee above said receptacle, a cover for said container, a tube supported in said cover and extending through said container to substantially the bottom of said receptacle, said tube having discharge and inlet openings at its upper and lower ends respectively, and a screw within said tube for lifting liquid from said receptacle and delivering it to the charge of coffee, an electric motor and means for establishing a driving connection between said motor and screw.

5. In an apparatus of the character described, the combination of a liquid receptacle, a container for a charge of coffee above said receptacle, a removable foraminous bottom in said container, a cover for said container and mechanically operated means supported by said cover within said receptacle, and adapted to be readily withdrawn therefrom for lifting liquid from said receptacle and delivering it to the charge of coffee.

6. In an apparatus of the character described, the combination of a liquid receptacle, a container for a charge of coffee above said receptacle, a removable foraminous bottom in said container, a cover for said container, a tube supported by said cover, extending through said bottom to substantially the bottom of said receptacle, said tube having discharge and inlet openings at its upper and lower ends respectively, and mechanically operated means within said tube for lifting liquid from said receptacle and delivering it continuously to the charge of coffee.

7. In an apparatus of the character described, the combination of a liquid receptacle, a container for a charge of coffee above said receptacle, a foraminous bottom in said container, a cover for said container, a tube supported by said cover and extending through said container to substantially the bottom of said receptacle, said tube having discharge and inlet openings at its top and bottom respectively, a screw within said tube, and means for actuating said screw to lift liquid in said tube from said receptacle and deliver it to the charge of coffee.

8. In an apparatus of the character described, the combination of a liquid receptacle, a container for a charge of coffee above said receptacle, a foraminous bottom in said container, a cover for said container, a tube supported by said cover and extending through said container to substantially the bottom of said receptacle, said tube having discharge and inlet openings at its top and bottom respectively, a screw within said tube and an electric motor for actuating said screw to lift liquid in said tube from said receptacle and deliver it to the charge of coffee.

9. In an apparatus of the character described, the combination of a liquid receptacle, a container for a charge of coffee provided with a removable foraminous bottom, mechanically operated means for lifting liquid from said receptacle and delivering it to the charge of coffee, and means to prevent delivery of the liquid when a surplus of liquid has accumulated within the container.

10. In an apparatus of the character described, the combination of a liquid receptacle, a container for a charge of coffee provided with a removable foraminous bottom, mechanically operated means for lifting liquid from said receptacle and delivering it to the charge of coffee, a float, and means controlled thereby to prevent delivery of the liquid when a surplus of liquid has accumulated within the container.

11. In an apparatus of the character described, the combination of a liquid receptacle, a container for a charge of coffee provided with a removable foraminous bottom, a tube extending through said bottom to substantially the bottom of said receptacle, a shaft in said tube provided with a screw to lift liquid from said receptacle and to deliver it to said container, and means to prevent delivery of the liquid when a surplus of liquid has accumulated in said container.

12. In an apparatus of the character described, the combination of a liquid receptacle, a container for a charge of coffee provided with a removable foraminous bottom, a tube extending through said bottom to substantially the bottom of said receptacle, means within said tube to lift liquid from said receptacle and deliver it to said container, a float mounted on said tube, and means controlled by said float to prevent the delivery of liquid when a surplus of liquid has accumulated in said container.

13. In an apparatus of the character described, the combination of a liquid receptacle, a container for a charge of coffee provided with a removable foraminous bottom, a tube extending through said bottom to substantially the bottom of said receptacle, means within said tube to lift liquid from said receptacle and to deliver it to said container, a float mounted on said tube, and means controlled by said float to prevent the delivery of liquid when a surplus of liquid has accumulated in said container, the inner wall of said float being fluted to prevent the accumulation of solid particles between said tube and inner wall.

14. In an apparatus of the character described, the combination of a liquid receptacle, a container for a charge of coffee provided with a removable foraminous bottom and a strainer held in place thereby, a tube extending through said bottom to substantially the bottom of said receptacle, a shaft within said tube provided with a screw to lift liquid from said receptacle and deliver it to said container, means to prevent delivery of the liquid when a surplus of liquid has accumulated in said container, an electric motor, and means for establishing a driving connection between said motor and shaft.

15. In an apparatus of the character described, the combination of a liquid receptacle, a container for a charge of coffee above said receptacle, a cover for said container, mechanically operated means supported by said cover for lifting liquid from said receptacle and means for continuously receiving the liquid and delivering it to the charge of coffee in a finely divided condition.

16. In an apparatus of the character described, the combination of a liquid receptacle, a container for a charge of coffee provided with a removable foraminous bottom, a strainer held in place thereby, a hollow cover for said container provided with a foraminous bottom, means supported by said cover for lifting liquid from said receptacle and delivering it continuously to the interior of said cover, the foraminous bottom of said cover serving to break up the liquid whereby it is delivered to the charge of coffee in a finely divided condition.

17. In an apparatus of the character described, the combination of a liquid receptacle, a container for a charge of coffee provided with a removable foraminous bottom, a strainer held in place thereby, a hollow cover for said container provided with a foraminous bottom, a tube supported by said cover extending through the bottom of said container to substantially the bottom of said receptacle, a shaft within said tube provided with a screw for lifting liquid from said receptacle and delivering it continuously to the interior of said hollow cover, a motor, and means for establishing a driving connection between said motor and shaft.

18. In an apparatus of the character described, the combination of a liquid receptacle, a container for a charge of coffee provided with a removable foraminous bottom, a strainer held in place thereby, a hollow cover for said container provided with a foraminous bottom, a tube extending through the bottom of said container to substantially the bottom of said receptacle, a shaft within said tube provided with a screw for lifting liquid from said receptacle and delivering it to the interior of said hollow cover, a motor, means for establishing a driving connection between said motor and shaft, and means within said container to prevent delivery of liquid thereto when a surplus of liquid has accumulated therein.

ROBERT E. WEST.

Witnesses:
Wm. O. Belt,
M. A. Kiddie.